United States Patent [19]

Bergheim et al.

[11] 4,388,013
[45] Jun. 14, 1983

[54] PIPE CONNECTION AND METHOD FOR PRODUCTION

[75] Inventors: Hans Bergheim; Winfried Griep, both of Bonn, Fed. Rep. of Germany

[73] Assignee: Vaw Leichtmetall GmbH, Dellweg, Fed. Rep. of Germany

[21] Appl. No.: 195,495

[22] Filed: Oct. 9, 1980

[30] Foreign Application Priority Data

Nov. 10, 1979 [DE] Fed. Rep. of Germany ....... 2945474

[51] Int. Cl.³ .......................... B25G 3/28; F16G 11/00
[52] U.S. Cl. .................................. 403/277; 285/382.4
[58] Field of Search ............... 403/276, 277, 278, 281, 403/279, 282, 280; 285/382.4; 29/506

[56] References Cited

U.S. PATENT DOCUMENTS

| 1,021,485 | 3/1912 | Ross | 285/382.4 X |
| 1,661,712 | 3/1928 | Van Wagner | 403/279 X |
| 1,921,642 | 8/1933 | Stephenson | 403/281 X |
| 2,125,552 | 8/1938 | Feldhoff | 285/382.4 X |
| 3,312,487 | 4/1967 | McIntyre | 285/320 X |
| 3,367,686 | 2/1968 | Kurz | 403/277 |
| 4,021,130 | 5/1977 | Crook | 403/277 X |
| 4,053,247 | 10/1977 | Marsh | 403/282 X |
| 4,274,665 | 6/1981 | Marsh | 403/282 X |

Primary Examiner—Wayne L. Shedd
Attorney, Agent, or Firm—Darby & Darby

[57] ABSTRACT

A method and apparatus for producing a pipe connection are disclosed. The apparatus includes an inner pipe formed on the pipe to be joined which has a widened end part. An outer pipe in the pipe connector is dimensioned to receive the inner pipe and has an undercut formed therein to receive the widened end part. A sleeve is mounted inside the inner pipe with a close tolerance so as to be substantially free from play. The sleeve has a widened wedge-shaped portion which engages the inner pipe internally. As a result, the inner pipe is retained between the undercuts and the wedge-shaped portion of the sleeve.

10 Claims, 14 Drawing Figures

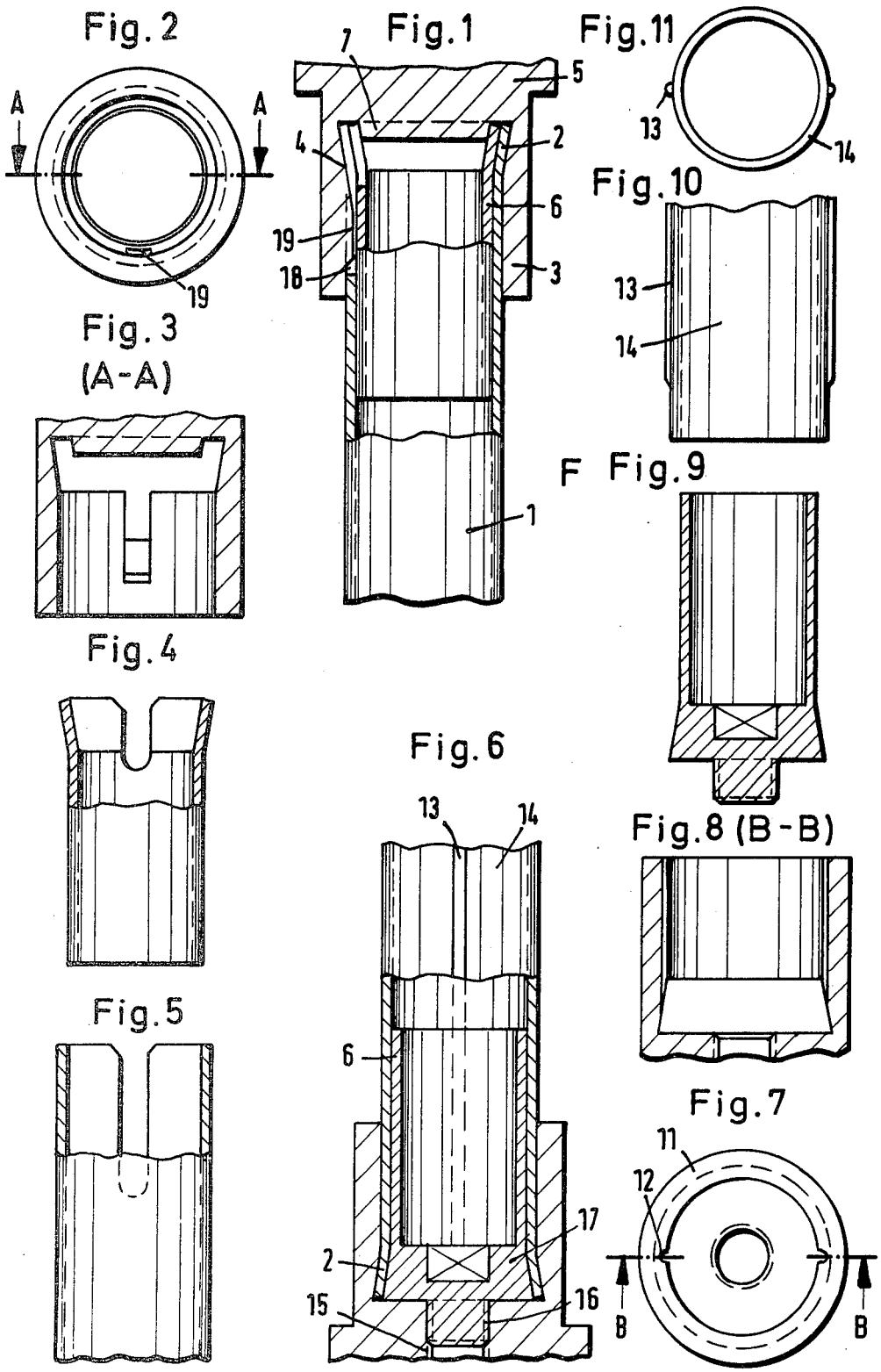

PIPE CONNECTION AND METHOD FOR PRODUCTION

The present invention concerns a pipe connection for joining pipes with flanges and solid or hollow sections, the connection including the pipe to be joined and a pipe connector.

It is known to produce pipe connections by soldering or welding. These thermal methods are relatively elaborate and result necessarily in an undesired drop in strength in the vicinity of the junction (heat influence zone), particularly in aluminum material. These disadvantages must therefore be counteracted in highly stressed parts by greater wall thicknesses, provision of reinforcement or by annealing.

It is also known to produce pipe connections by cementing. Since the strength of these connections is frequently not sufficient, particularly under dynamic stress, additional fine threads are cut into the connecting parts. This combination type of fastening is not absolutely rotation proof, however, and is therefore not always sufficient for highly stressed parts to be cemented.

The object of the present invention is therefore to provide a pipe connector for joining pipes with flanges and solid or hollow sections, which permits, with a minimum of wall thickness, a high-strength, fixed connection without additional reinforcement parts. This is achieved according to the invention in that the pipe to be joined has an inner pipe with a widened or flared end, which is arranged in an outer pipe bearing the flange, for example, and having undercuts and that a sleeve is mounted in the inner pipe with a narrow tolerance (free from play), which has a wedge portion, the flared end of the pipe to be joined being captured between the undercut of the pipe connector and the wedge portion.

In an advantageous manner a cemented joint can be produced between the inner pipe and the sleeve, as well as between the inner pipe and the outer pipe connector. The recesses serve to receive the excess cement, and are obtained by the widening of the pipes. The material of the connector consists preferably of aluminum and its alloys. By spreading the sleeve, the effective surface of the parts to be connected is increased and the adhesion between the parts is thus improved. Providing a thread between the pipe connector and the sleeve permits shortening the length of the pipe connection, since the thread can tolerate additional force. The use of a centering piece in the pipe connection permits even better centering of the parts to be connected. The pipe connection can be produced from any cross section, e.g. round, square or oval. The invention will now be described more fully on the basis of several embodiments.

FIG. 1 shows a longitudinal section through a pipe connection according to a first embodiment of the invention;

FIG. 2 shows a cross-section of the pipe connection represented in FIG. 1;

FIG. 3 shows a longitudinal section along line A—A of FIG. 2;

FIG. 4 shows a longitudinal section through a sleeve as utilized in FIG. 1;

FIG. 5 shows a longitudinal section through an inner pipe as utilized in FIG. 1;

FIG. 6 shows a longitudinal section through an embodiment of the pipe connection which incorporates a screw joint;

FIG. 7 shows a cross section through the outer pipe utilized in FIG. 6;

FIG. 8 shows a longitudinal section through the outer pipe along line B—B of FIG. 7;

FIG. 9 shows a longitudinal section through a sleeve as utilized in FIG. 6;

FIG. 10 shows a longitudinal section through an inner pipe as utilized in FIG. 6;

FIG. 11 shows a cross section through the inner pipe of FIG. 10.

Figure 12:
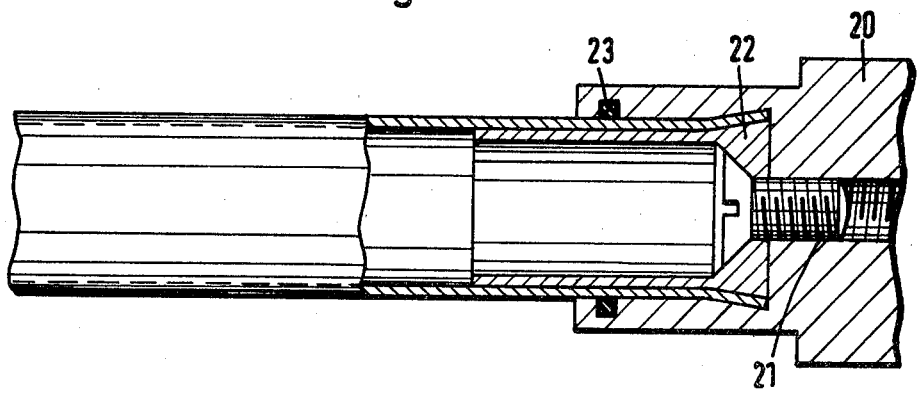
FIGS. 12, 13 and 14 show longitudinal sections through other embodiments of the pipe connection.

FIG. 1 shows the pipe connection according to the invention, consisting of an inner pipe 1 which is for most of its extent generally cylindrical and which has a widened or flared generally frusto-conical end part 2, an outer generally cylindrical portion 3 of pipe connector 5 with undercuts 4, and a sleeve 6 with generally frusto-conical a wedge-shaped generally frusto-conical end and a generally cylindrical shaft end. In the represented embodiment, inner pipe 1 is joined with pipe connector 5 by the pipe connection.

FIG. 1 shows furthermore that sleeve 6 is attached on a centering piece 7 of pipe connector 5. This facilitates the assembly of the parts to be connected. In inner pipe 1 and outer portion 3 of pipe connector 5, respectively, are arranged a groove 18 and a wedge 19 extending thereinto, to prevent rotation. The interaction of the parts to be connected can be seen from FIGS. 2 to 5.

FIG. 6 shows another embodiment of the pipe connection according to the invention. Sleeve 6' has a generally frusto-conical wedge portion 17, which is screwed with a male thread 16 into female thread 15 of pipe connector 5'. Inner pipe 14 has two oppositely arranged lugs 13 which engage corresponding recesses 12 in outer pipe connector 11 to prevent rotation (FIG. 7). The widened end part 2 of inner pipe 14 remains unchanged. The interaction of the parts to be connected in this preferred embodiment can be seen from FIGS. 8 to 11.

Figure 13:
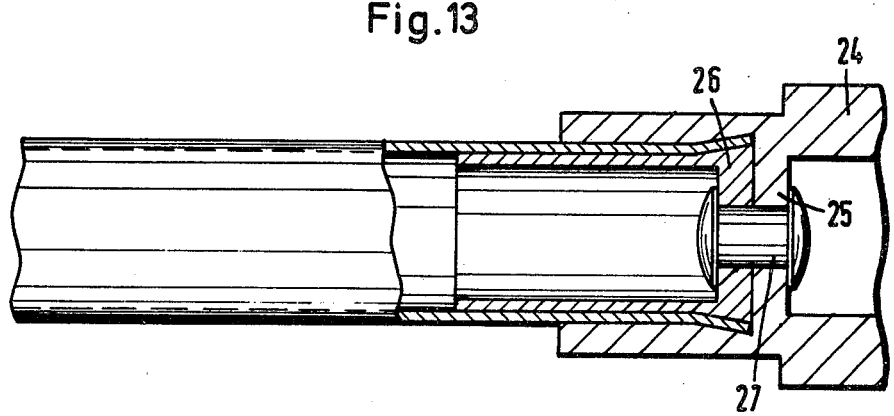
Figure 14:
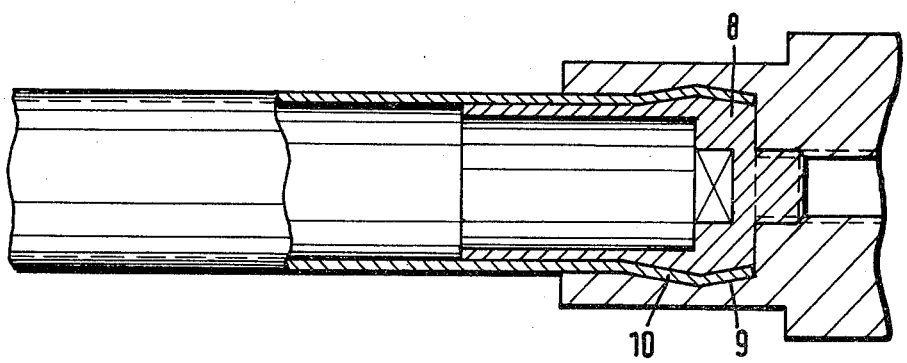

FIGS. 12 to 14 show additional embodiments of the pipe connection according to the invention. In FIG. 12 a sealing ring 23 is arranged between connector 20 and the inner pipe to seal the junction of the pipe connection from environmental influences and harmful substances, particularly from water, acids and bases. The sleeve is anchored in connector 20 with a funnel-shaped generally frusto-conical end piece 22 by means of a screw 21 with a control screw head.

In FIG. 13 connector 24 is joined with sleeve 26 and bottom 25 of the outer piece by means of a rivet 27. This connection can be produced particularly quickly.

In the embodiment according to FIG. 14, wedge piece 8 has a double taper in the form of a double cone frustum. The inner pipe and the undercut 9 are correspondingly shaped at the junction. In this manner, the adhesive surface between the parts to be connected is increased.

The pipe connection according to the invention is produced as follows:

1. The sleeve is inserted into the outer pipe connector and secured, if necessary, in longitudinal direction by screws or rivets.

2. The inner pipe is inserted onto the sleeve up to the point where wedge or generally frusto-conical portion (e.g., 17) starts.

3. The inner pipe is pushed by pressure over wedge or generally frusto-conical portion and is thereby widened; in the double cone frustum, the cross-section of the inner pipe is first widened, and subsequently tapered on the outer wall of the undercut, after the greatest cone diameter has been exceeded.

4. When a cement is used, it is applied either on the sleeve before the sleeve is inserted; or on the inner surface of the inner pipe; the adhesive surface can extend over the entire contact zone between sleeve and inner pipe, depending on the desired strength. In order to increase the strength, cement can be applied additionally in the contact zone between outer pipe and inner pipe.

Sealing ring 23 represented in FIG. 12 between connector 20 and the inner pipe is made of conventional sealing material, such as neoprene. In the assembly of the pipe connection according to the invention, care must be taken that a complete seal is achieved in the direction of the diameter of the gasket, both with regard to connector 5 and with regard to the inner pipe. This can be achieved by pressing the gasket correspondingly in the direction of its diameter.

In the longitudinal axis of the pipe connection, however, the gasket must have sufficient play to have enough space for yielding laterally during the assembly.

Although preferred forms of the invention have been disclosed for illustrative purposes, many additions, modifications and substitutions are possible without departing from the scope and spirit of the invention as defined in the accompanying claims. For example, it has been pointed out that the invention is not limited to pipes of circular cross-section. It may in fact be practiced with conduits having any cross-sectional contour. As used in the claims, the term "pipe" will therefore be understood to have this more complete meaning.

What is claimed is:

1. A connection for joining a pipe with a pipe connection having a flange or a solid or hollow section comprising:

an inner pipe which is for most of its extent generally cylindrical and which has a widened generally frusto-conical end part;

an outer pipe connector receiving said inner pipe therein and having a generally frusto-conical undercut formed therein and receiving said widened end part; and a sleeve mounted inside said inner pipe with a close tolerance so as to be substantially free from play, said sleeve being for most of its extent generally cylindrical and having a widened generally frusto-conical portion which engages said inner pipe internally, said inner pipe being retained between the undercut thereof and said frusto-conical portion of the sleeve, and means to prevent relative rotation of said pipe connector and inner pipe.

2. A pipe connection according to claim 1, characterized in that said inner pipe and at least one of said sleeve and said outer pipe connector are bonded to each other.

3. A pipe connection according to claim 2, characterized in that recesses for receiving a bonding material are provided between said inner pipe and the frusto-conical portion of said sleeve.

4. A pipe connection according to any of the preceding claims, characterized in that the frusto-conical portion is at the end of said sleeve and tapers on the outside thereof, said undercut being an inside taper spaced from said frusto-conical portion and conforming thereto.

5. A pipe connection according to any of claims 1-3, characterized in that the frusto-conical portion is near the end of said sleeve and is provided with a double taper in the form of a double cone frustum which flares and then tapers and that the undercut receives the double cone frustum enclosed by the inner pipe with a close tolerance so as to be substantially free from play.

6. A pipe connection according to any of claims 1-3, characterized in that the outer pipe connector is provided with grooves, said inner pipe having correspondingly shaped lugs which engage said grooves to prevent relative rotation of said pipe connector and inner pipe.

7. A pipe connection according to any of claims 1-3 further comprising means for physically joining said sleeve to said pipe connector at one end thereof.

8. A pipe connection according to claim 7 wherein said joining means comprises a member projecting from said one end of said sleeve and having an external thread thereon, said pipe connector having a bore in said one end with an internal thread adapted to mate with the external thread of said projecting member.

9. A pipe connection according to any of claims 1-3 further comprising a wedge member mounted within said outer pipe connector to project thereinto in a direction generally perpendicular to the length thereof, said inner pipe having a recess positioned opposite said wedge member and dimensioned to have at least a portion of said wedge member extend thereinto to prevent relative rotation of said pipe connector and inner pipe.

10. A pipe connection according to any of claims 1-3 further comprising a centering piece mounted to an end of said pipe connector to project therefrom, said centering piece tapering and being dimensioned to be received within said sleeve.

* * * * *